United States Patent
Kuroiwa et al.

(10) Patent No.: US 7,237,124 B2
(45) Date of Patent: Jun. 26, 2007

(54) CONTENTS RECORDER/REPRODUCER

(75) Inventors: Toshio Kuroiwa, Kanagawa-ken (JP); Seiji Higurashi, Tokyo (JP)

(73) Assignee: Victor Company of Japan Limited, Yokohama (JP)

( * ) Notice: Subject to any disclaimer, the term of this patent is extended or adjusted under 35 U.S.C. 154(b) by 809 days.

(21) Appl. No.: 10/341,421

(22) Filed: Jan. 14, 2003

(65) Prior Publication Data
US 2003/0140239 A1    Jul. 24, 2003

(30) Foreign Application Priority Data
Jan. 18, 2002    (JP)    ............................ P2002-010662

(51) Int. Cl.
*H04L 9/32*    (2006.01)
(52) U.S. Cl. ........................... 713/193; 726/27; 726/30; 726/32; 726/33; 380/44; 380/45; 380/203; 380/277
(58) Field of Classification Search ..................... None
See application file for complete search history.

(56) References Cited
U.S. PATENT DOCUMENTS 5,058,162 A * 10/1991 Santon et al. ................ 705/51
5,677,952 A * 10/1997 Blakley et al. .............. 713/189
6,516,064 B1 * 2/2003 Osawa et al. ................ 380/201
6,938,162 B1 * 8/2005 Nagai et al. ................. 713/189
2003/0016826 A1 * 1/2003 Asano et al. ................ 380/277

FOREIGN PATENT DOCUMENTS

| JP | 08-335182 | 12/1996 |
| JP | 2001-184787 | 7/2001 |
| WO | 00/67130 A1 | 11/2000 |

OTHER PUBLICATIONS

Ripe, et al, 'Digital rights Management', Wikipedia, Apr. 1, 2007, revision of 'DRM and audio CDs', entire document, http://en.wikipedia.org/wiki/Digital_Rights_Management.*

* cited by examiner

*Primary Examiner*—Nasser Moazzami
*Assistant Examiner*—Ronald Baum
(74) *Attorney, Agent, or Firm*—The Nath Law Group; Jerald L. Meyer; Stanley N. Protigal

(57) ABSTRACT

A unidirectional function circuit generates a first encryption key according to the device identification information stored in a device identification information holding unit. Another unidirectional function circuit generates a second encryption key that depends on a write block address. A contents key generator generates a contents key using the first encryption key, second encryption key, and relation information. An encryptor records contents, which are encrypted using the contents key, onto a HDD.

5 Claims, 3 Drawing Sheets

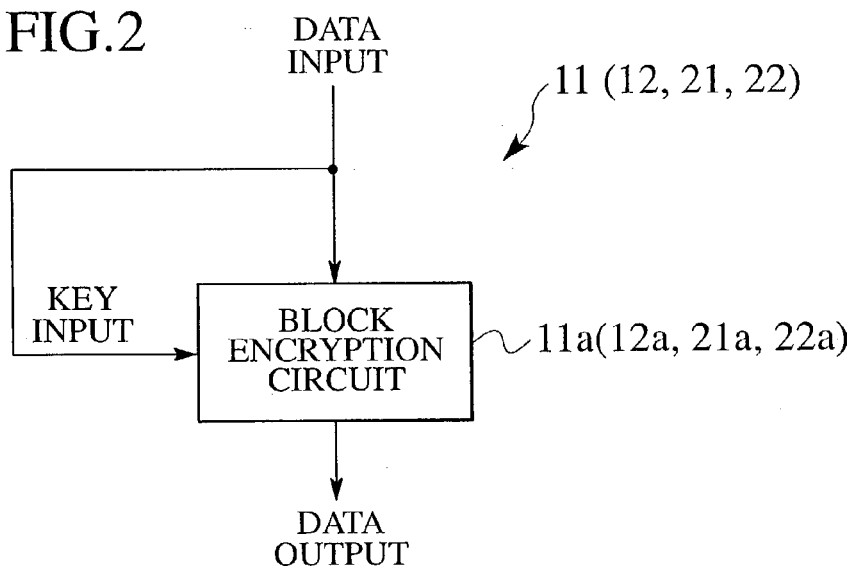
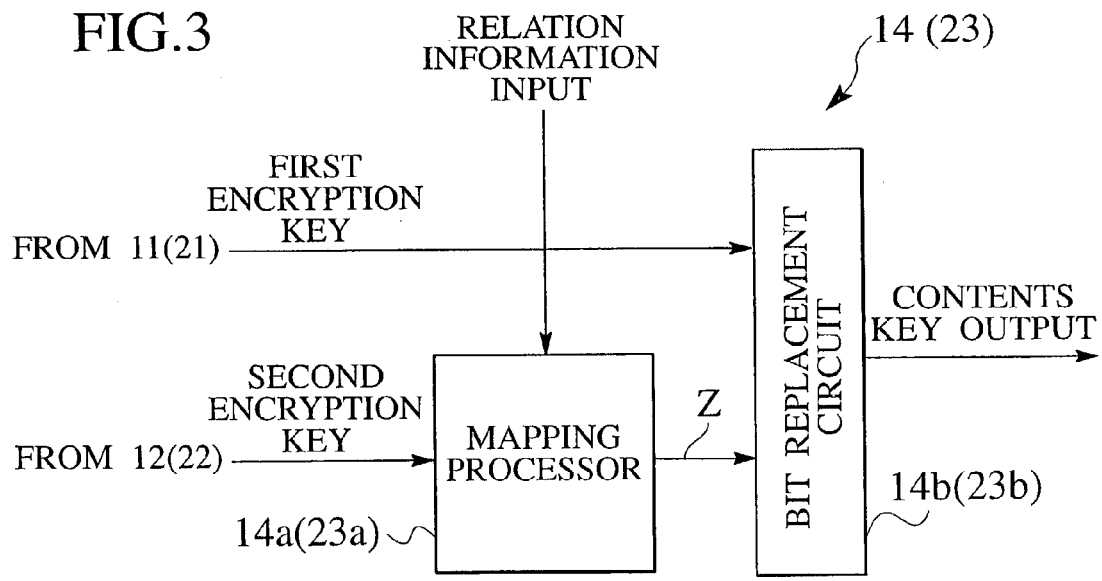

| MANAGEMENT INFORMATION NUMBER | RECORDING DATE/TIME | RECORDING START ADDRESS | SIZE |
|---|---|---|---|
| 1 | 2000/12/12 | 0 | 1000 |
| 2 | 2000/12/13 | 1500 | 100 |
| 3 | 2001/1/1 | 2000 | 980 |
| ⋮ | ⋮ | ⋮ | ⋮ |

CONTENTS RECORDER/REPRODUCER

BACKGROUND OF THE INVENTION

1. Field of the Invention

The present invention relates to a contents recorder/reproducer that can protect contents that are recorded and reproduced.

2. Description of the Related Art

Although a digitized audio-visual work called contents has conventionally been difficult to handle because of its large size, a recent advance in the high-density recording/reproduction technology makes contents distribution more popular.

One of the merits of digitization is that information is not degraded even if copied. On the other hand, an infringement of a reproduction right through illegal copies has become evident.

Contents encryption is efficient for preventing illegal copies.

For example, when recorded on a digital video disc (DVD), video information is encrypted to prevent it from being reproduced unless the information is decrypted using a predetermined procedure.

In this type of encryption, contents to be recorded are encrypted in advance using, for example, predetermined key information. In general, a sequence of synchronous blocks, each with a predetermined length, is formed on a recording medium such as a DVD and the encrypted contents are recorded in units of synchronous blocks. Each synchronous block has a block address that uniquely identifies the synchronous block. The block address is recorded in advance at the start of each synchronous block.

Contents are recorded on, or reproduced from, a recording medium, for example, by the micro-controller and the file system software that control the whole recorder/reproducer.

When contents are recorded, encrypted contents are divided into synchronous blocks and are sequentially recorded while searching the block management table on the recording medium for synchronous blocks into which contents may be written. A similar procedure is used to record key information, which is used to encrypt the contents, on the recording medium.

When contents are reproduced from a recording medium, the same key information as that used for encryption is used for decryption. To do so, the key information recorded in advance on the recording medium is read and the key information that was read is used to decrypt contents read from the synchronous blocks.

The encryption technology described above encrypts contents to be recorded on a recording medium and hides the key information and the encryption algorithm to prevent the contents, read from the recording medium, from being copied to another recording medium.

However, if the encryption algorithm is analyzed and the key information is read from the recording medium, the encryption technology described above cannot prevent the contents from being copied.

In addition, the contents such as those described above are large in size, meaning that there is a large amount of data encrypted with a single key from the viewpoint of encryption algorithm analysis. Therefore, it is required to make the analysis of the algorithm more difficult.

Another disadvantage in using a single key for encrypting the whole contents is that, once the encryption algorithm is known, the whole contents may be decrypted by the single key.

SUMMARY OF THE INVENTION

In view of the foregoing, it is an object of the present invention to provide a contents recorder/reproducer that can prevent contents from being copied.

To achieve the above object, there is provided a contents recorder/reproducer recording contents on a recording medium and reproducing the recorded contents, comprising: encryption key generating means that uses first key information common to a plurality of recording blocks on the recording medium and second key information unique to each recording block to generate an encryption key used for encrypting contents of each the recording block.

In a preferred embodiment of the present invention, the second key information is encryption key information depending upon address information on each recording block, the recorder/reproducer further comprising: recording means for recording a part or all of relation information on the recording medium, the relation information being information on a relation between the address information and the encryption key information.

In a preferred embodiment of the present invention, the first key information is encryption key information corresponding to identification information unique to each contents recorder/reproducer.

In a preferred embodiment of the present invention, the recording means records the relation information in an area separate from an area in which the address information on the recording blocks and the encrypted contents are recorded.

As described above, the encryption key generation means of the contents recorder/reproducer uses the first key information common to a plurality of recording blocks on a recording medium and the second key information about each recording block to generate an encryption key for encrypting the contends of each recording block. The generated encryption key is used to encrypt the contents to be recorded on the recording medium. The contents encrypted using these encryption keys are recorded in a predetermined block on the recording medium.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a block diagram showing the configuration of a unidirectional function circuit included in the recorder/reproducer;

FIG. 3 is a block diagram showing the configuration of a contents key generator included in the recorder/reproducer;

DESCRIPTION OF THE PREFERRED EMBODIMENTS

The present invention may be applied to a recorder/reproducer, such as a hard disk recorder, that can record and reproduce video or other contents to and from a recording medium such as a hard disk drive (HDD).

(Configuration)

Figure 1:
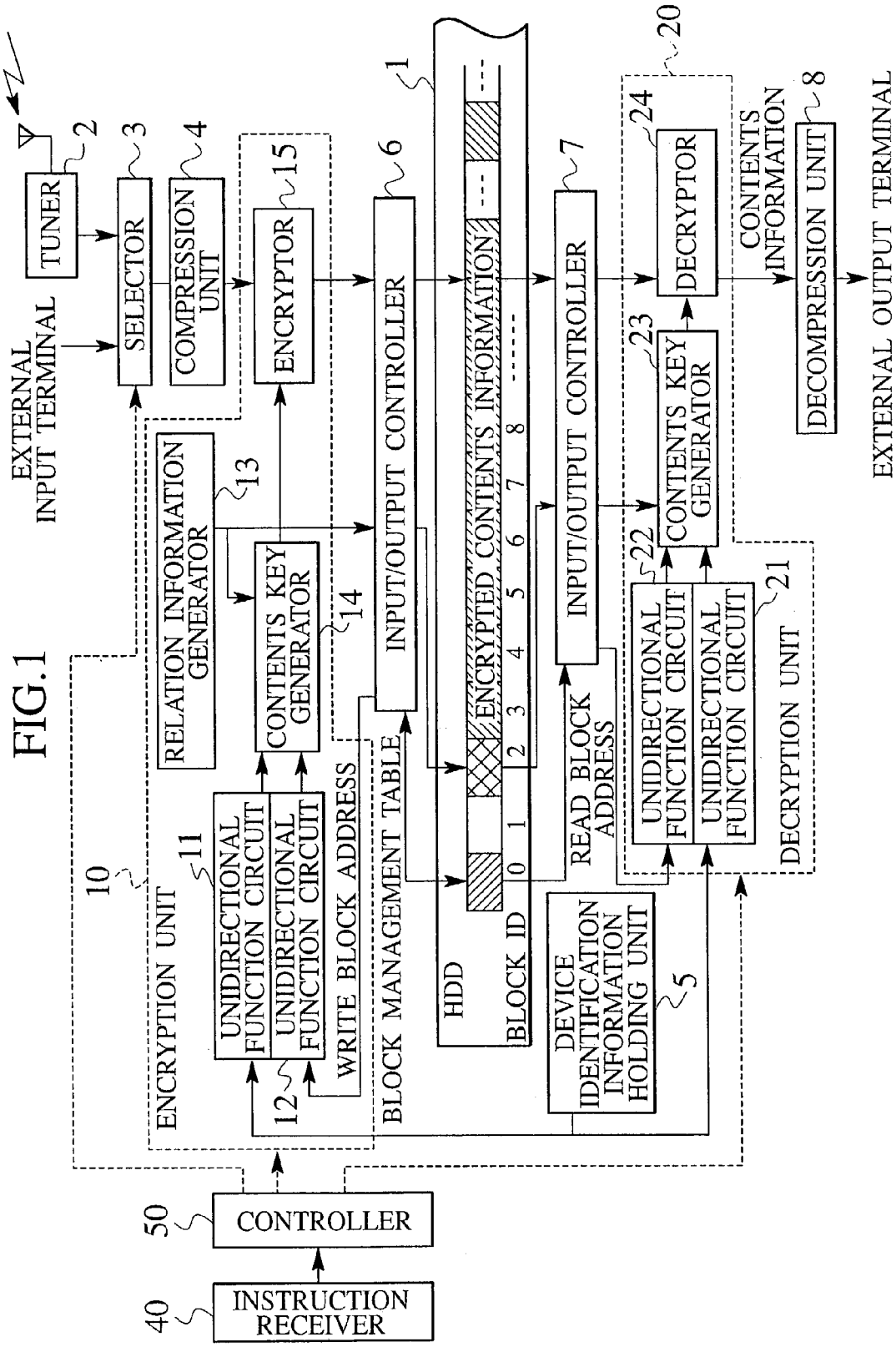
FIG. 1 is a diagram showing the configuration of a recorder/reproducer in an embodiment of the present invention.

A recorder/reproducer in one embodiment of the present invention comprises an encryption unit 10 and a decryption unit 20 as shown in FIG. 1. The encryption unit 10 encrypts contents to be recorded on contents-storing recording means 1 (hereinafter simply called an HDD) such as a hard disk drive (HDD) that uses magnetic disks as recording media. The decryption unit 20 decrypts contents read from the HDD 1.

The recorder/reproducer further comprises a tuner 2 that receives programs sent via digital broadcasting such as satellite digital broadcasting and outputs the contents thereof and a selector 3 that selects contents information received from an external input terminal or contents information from the tuner 2. Contents such as compressed video information are sent via satellite digital broadcasting, and the tuner 2 decompresses received contents and sends the decompressed results to the selector 3. The selector 3 also receives uncompressed contents from the external terminal.

To compress uncompressed contents, the recorder/reproducer has a compression unit 4 that compresses contents received via the selector 3 and sends the compressed results to the encryption unit 10. The compression unit 4 compresses received video information, audio information, and so on using, for example, the MPEG (Moving Picture Experts Group)-2 standard and sends the compressed result to the encryption unit 10.

The recorder/reproducer further comprises a device identification information holding unit 5 that holds identification information (for example, device identification number) unique to each device, an input/output controller 6 that controls the recording of contents encrypted by the encryption unit 10 onto the HDD 1, an input/output controller 7 that controls the reading of encrypted contents from the HDD 1, a decompression unit 8 that decompresses the contents read from the HDD 1 and decrypted by the decryption unit 20, an instruction receiver 40 that receives an instruction from the user, and a controller 50 that control the whole device.

Preferably, the device identification information holding unit 5 has a configuration that makes it difficult to change or read device identification information held in this unit. For example, this unit may be provided in the ROM in the IC package of the controller 50.

The encryption unit 10 comprises a unidirectional function circuit 11 that generates an encryption key (first encryption key [first key information]) corresponding to the device identification information held in the device identification information holding unit 5, a unidirectional function circuit 12 that generates an encryption key (second encryption key [second key information]) according to the recording position (write block address) of contents information controlled by the input/output controller 6, a relation information generator 13 that generates information according to the generation method of an encryption key, a contents key generator (encryption key generation means) 14 that generates an encryption key (contents key) used to encrypt contents information according to the encryption keys generated by the unidirectional function circuits 11 and 12, and an encryptor 15 that encrypts contents information using an encryption key generated by the contents key generator 14.

The decryption unit 20 comprises a unidirectional function circuit 21 that generates an encryption key (first encryption key) corresponding to the device identification information held in the device identification information holding unit 5, a unidirectional function circuit 22 that generates an encryption key (second encryption key) according to the reproduction position (read block address) of contents information controlled by the input/output controller 7, a contents key generator 23 that generates an encryption key (contents key) used to encrypt contents information according to the encryption keys generated by the unidirectional function circuits 21 and 22, and a decryptor 24 that decrypts contents information encrypted using the encryption key generated by the contents key generator 23.

Each unidirectional function circuit 11 (12, 21, 22) has a feature that it is difficult to estimate an input value based on an output value. These unidirectional function circuits output data (output value) uniquely determined for input data (input value) according to a known procedure such as the DES (Data Encryption Standard) method, one of block encryption methods. To implement this function, the unidirectional function circuit 11 has a block encryption circuit 11a such as the one shown in FIG. 2. The block encryption circuit performs transposition and inversion for an input data string according to a pre-set encryption key to encrypt the input data string.

The unidirectional function circuit 11 may also be configured so that it can execute processing other than block encryption. In such a case, the unidirectional function circuit 11 has a circuit for desired processing instead of the block encryption circuit 11a.

The relation information generator 13, provided for preventing the contents key generator 14 from executing monotonous encryption, generates a sequence of random numbers and sends the generated sequence to the contents key generator 14.

In response to the received sequence, the contents key generator 14 changes the operation algorithm for generating a contents key. To implement this function, the contents key generator 14 comprises a mapping processor 14a and a bit replacement circuit 14b as shown in FIG. 3. The mapping processor 14a determines the correspondence relation (mapping) between the second encryption key and the output value according to the relation information (sequence) received from the relation information generator 13. The bit replacement circuit 14b generates a contents key from the first encryption key and the output value of the mapping processor 14a.

Figures 4, 5:
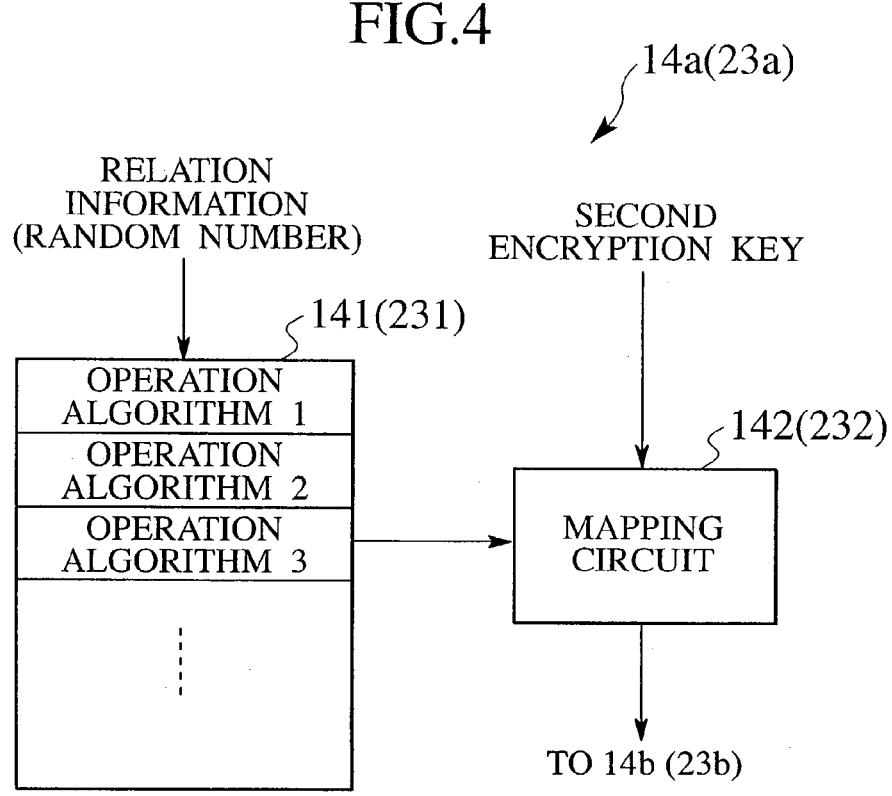
FIG. 4 is a block diagram showing the configuration of a mapping processor included in the contents key generator.
FIG. 5 is a diagram showing an example of a block management table for managing data to be recorded on an HDD included in the recorder/reproducer.

More specifically, the mapping processor 14a comprises a table 141 and a mapping circuit 142 as shown in FIG. 4. The table 141 contains an operation algorithm corresponding to each unit of relation information. The mapping circuit 142 calculates an output value corresponding to the second encryption key according to the operation algorithm selected by the relation information received from the relation information generator 13. The table 141 contains, for example, a bit string ($a_i$ [i=0, 1, 2, ..., 7]) corresponding to each unit of relation information. For example, the mapping circuit 142 uses the expression below to calculate an output value $Z(x)$ from the bit string $a_i$ selected according to the relation information received from the relation information generator 13 and the second encryption key $Y(x)$.

$$Y(x) \cdot x^n = P(x) \cdot Q(x) + Z(x)$$

$$Q(x) = \sum_{i=0}^{7} a_i x^i$$

By calculating the output value Z corresponding to the second encryption key according to the relation information generated by the relation information generator 13, the output value Z corresponding to the same block address may be varied according to the relation information. By generating the contents key using the output value Z generated in this way and the first encryption key, it becomes difficult to analyze the recorded contents that have been encrypted by the contents key.

(Synchronous Block)

Synchronous blocks (recording blocks), each with a predetermined length, are formed on the recording medium of the HDD 1 as shown in FIG. 1 described above. Data such as contents recorded on the HDD 1 is recorded in units of blocks.

Identification information (block address=0, 1, 2, . . . ) is allocated to each synchronous block, and the block address is recorded at the start of the synchronous block. At recording or reproduction time, this block address is used to uniquely identify a synchronous block to be recorded or reproduced.

A block management table is also recorded in a predetermined synchronous block (for example, the block at block address 0) to store which contents are recorded in which block.

As shown in FIG. 5, this block management table stores the block address of the start position of each contents recording area (recording start address) and the number (size) of blocks used.

When recording contents, the input/output controller 6 references the block management table to find a free area, records contents there, and updates the block management table.

When reproducing contents, the input/output controller 7 references the block management table, obtains the recording position of the contents to be reproduced, and reproduces the contents.

This block management table is used for usual input/output operations. On the other hand, the input/output controller 6 records the relation information, which is generated by the relation information generator 13, in an area not referenced via the block management table.

Recording the relation information in such an area prevents the relation information from being copied with encrypted contents information. In addition, because a general input/output device cannot directly access the relation information, the possibility that the relation information will be copied is reduced. It is also possible not to store the address of the synchronous block, in which the relation information is recorded, in the block management table described above. This will easily increase confidentiality.

(Second Encryption Key)

The second encryption key is generated as follows. First, the input/output controller 6 determines a synchronous block in which contents will be recorded and sends the address of the synchronous block (write block address) to the unidirectional function circuit 12. Then the unidirectional function circuit 12 generates the second encryption key.

(Recording Operation)

When the user operates the instruction receiver 40 to select contents to be recorded (for example, contents received from the tuner 2 or contents received from an external terminal), the controller 50 of the recorder/reproducer with the above configuration causes the selector 3 to select user-selected contents and sends the selected contents to the compression unit 4.

The compression unit 4 compresses the received contents using, for example, the MPEG-2 method described above and sends the result to the encryption unit 10.

The relation information generator 13 generates relation information according to an instruction from the controller 50. This relation information is sent to the mapping circuit 142 of the contents key generator 14.

On the other hand, the input/output controller 6 references the block management table to determine the recording position of the contents compressed by the compression unit 4. This recording position is sent to the unidirectional function circuit 12 as the write block address of the block. In accordance with the received write block address, the unidirectional function circuit 12 generates a second encryption key and sends the generated second key to the contents key generator 14.

The contents key generator 14 also receives a first encryption key generated by the unidirectional function circuit 11 that receives the device identification information from the device identification information holding unit 5. In response to the second encryption key, the contents key generator 14 generates the contents key according to the first encryption key, second encryption key, and relation information and sends the generated contents key to the encryptor 15.

The encryptor 15 encrypts the contents received from the compression unit 4, a predetermined length of contents at a time (length corresponding to the synchronous block length described above), using the contents key received from the contents key generator 14 and sends the encrypted contents to the input/output controller 6.

The input/output controller 6 records the contents received from the encryptor 15 onto the HDD 1, one synchronous block at a time.

Because the contents key differs between synchronous blocks as described above, the contents recorded in a synchronous block are encrypted by an encryption key (contents key) unique to that synchronous block and then recorded on the HDD 1.

After recording the encrypted contents on the HDD 1 as described above, the input/output controller 6 updates the block management table. At the same time, the input/output controller 6 records the relation information, generated by the relation information generator 13, in a predetermined synchronous block on the HDD 1.

(Reproduction Operation)

When the user who wants to reproduce contents operates the instruction receiver 40 to select contents to be reproduced, the input/output controller 7 starts reading the selected contents from the HDD 1.

First, the input/output controller 7 reads the relation information from the predetermined area on the HDD 1 and sends the relation information to the contents key generator 23.

Next, the input/output controller 7 references the block management table to find the synchronous block in which the selected contents are recorded and reads the encrypted contents from that synchronous block.

At the same time, the input/output controller 7 sends information on the synchronous block (read block address), from which the contents are being read, to the unidirectional function circuit 22.

The contents key generator 23 also receives a first encryption key generated by the unidirectional function circuit 21 that receives the device identification information from the device identification information holding unit 5. In response to the second encryption key, the contents key generator 23 generates the contents key according to the first encryption key, second encryption key, and relation information and sends the generated contents key to the decryptor 24.

The decryptor 24 decrypts the encrypted contents, received from the input/output controller 7, using the contents key received from the contents key generator 23 and sends the decrypted contents to the decompression unit 8. In this way, the contents encrypted by the contents key that differs between synchronous blocks may be decrypted.

The decompression unit 8 decompresses the received contents and sends them to a device such as a monitor via the external output terminal.

(Effects)

As described above, this recorder/reproducer uses the encryption key (first encryption key) unique to the device and the encryption key (second encryption key) that depends on the recording position on the recording means (HDD 1), on which the contents are to be recorded, to generate an encryption key for encrypting the contents to be recorded. Therefore, even if the user removes the recording means from the device and tries to reproduce the contents from the recording means on another device, the contents cannot be decrypted because the first encryption key differs from that of the original device. In addition, even if the user copies contents to some other recording means in some way or other, it is virtually impossible to decrypt the contents because the original recording position information is lost. Thus, this recorder/reproducer prevents a copy of the contents from being made.

(Modification)

Although, in the above description, the contents key generator 14 receives a sequence of random numbers from the relation information generator 13 to change the contents key generation algorithm, the mapping processor 14*a* and relation information generator 13 are not necessary if the contents key generated by the first key information and the second key information meet the need. In addition, the configuration of the recorder/reproducer may be changed as necessary within the scope of the technological concept of the present invention.

As described above, the encryption key generation means of the contents recorder/reproducer according to the present invention uses the first key information common to a plurality of recording blocks on a recording medium and the second key information about each recording block to generate an encryption key for encrypting the contends of each recording block. The generated encryption key is used to encrypt the contents to be recorded on the recording medium. The encrypted contents are recorded in a predetermined block on the recording medium.

In this way, the contents to be recorded on the recording medium are encrypted using the encryption key that differs between recording blocks. The size of a recording block on the recording medium is very small as compared with the size of the contents. This means that the contents are divided into a very large number of recording blocks for recording and that a very large number of encryption keys are used for encrypting the whole contents. The recorded contents cannot be restored unless all key information is known. Therefore, this contents recorder/reproducer prevents a copy of the contents from being made by making it difficult to reproduce the contents unless all key information is available.

In addition, if identification information unique to each contents recorder/reproducer or information dependent on this identification information is used as the first key information and if this first key information is not recorded on the recording medium, the reproduction of the contents illegally read from the recording medium becomes even more difficult.

It should be understood that many modifications and adaptations of the invention will become apparent to those skilled in the art and it is intended to encompass such obvious modifications and changes in the scope of the claims appended hereto.

What is claimed is:

1. A contents recorder that records contents on one or more recording blocks of a recording medium, comprising:
   a storage unit configured to store first key information that is unique to the contents recorder;
   a relation information generating unit configured to generate relation information including a random series for changing at random second key information determined according to a write/read block address for the contents to be recorded on or reproduced from the recording medium;
   an encryption key generating unit configured to change the second key information at random according to the relation information and generate an encryption key used for encrypting contents of each recording block with the first key information and the changed second key information;
   an encrypting unit configured to encrypt the contents of each recording block; and
   a recording unit configured to record the encrypted contents of each recording block and the relation information on the recording medium.

2. The contents recorder according to claim 1, wherein the recording unit records the relation information in an area separate from an area in which address information on the recording blocks and the encrypted contents are recorded.

3. A method for use in a contents recorder that records contents on one or more recording blocks of a recording medium with first key information that is unique to the contents recorder, comprising:
   generating relation information including a random series for changing at random second key information determined according to a write/read block address for the contents to be recorded on or reproduced from the recording medium;
   changing the second key information at random according to the relation information;
   generating an encryption key used for encrypting contents of each recording block with the first key information and the changed second key information;
   encrypting the contents of each recording block; and
   recording the encrypted contents of each recording block and the relation information on the recording medium.

4. A contents decrypting apparatus that decrypts contents encrypted with an encryption key different for each recording block of a recording medium and recorded thereon, comprising:
   a storage unit configured to store first key information that is unique to the contents decrypting apparatus;

a reading unit configured to read from the recording medium, the contents encrypted with the encryption key different for each recording block and recorded thereon, and relation information recorded in an area separate from an area in which the encrypted contents are recorded;

a key information generating unit configured to generate second key information different for each recording block of the contents according to the read relation information and a write/read block address for the contents;

a decryption key generating unit configured to generate an decryption key different for each recording block according to the first key information and the generated second key information different for each recording block; and a decrypting unit configured to decrypt the contents encrypted with the encryption key different for each recording block and recorded, with the generated decryption key.

5. A method for decrypting contents encrypted with an encryption key different for each recording block of a recording medium and recorded thereon, comprising:

reading first key information that is unique to a contents decrypting apparatus from a storage unit;

reading from the recording medium, the contents encrypted with the encryption key different for each recording block and recorded thereon, and relation information recorded in an area separate from an area in which the encrypted contents are recorded;

generating second key information different for each recording block of the contents according to the read relation information and a write/read block address for the contents;

generating an decryption key different for each recording block according to the first key information and the generated second key information different for each recording block; and decrypting the contents encrypted with the encryption key different for each recording block and recorded, with the generated decryption key.

* * * * *